United States Patent

Schmoock

[11] Patent Number: 4,727,755
[45] Date of Patent: Mar. 1, 1988

[54] ELECTROMAGNETIC FLOWMETER WITH ALTERNATING PERMANENT MAGNET FIELD

[75] Inventor: Roy F. Schmoock, Yardley, Pa.
[73] Assignee: Fischer & Porter Co., Warminster, Pa.
[21] Appl. No.: 938,870
[22] Filed: Dec. 8, 1986
[51] Int. Cl.[4] .................................................. G01F 1/60
[52] U.S. Cl. ................................ 73/861.12; 73/861.17
[58] Field of Search ............ 73/861.12, 861.13, 861.17
[56] References Cited

U.S. PATENT DOCUMENTS 4,409,846 10/1983 Ueno ................................. 73/861.17
4,601,209 7/1986 Amata ................................ 73/861.17

Primary Examiner—Charles A. Ruehl
Attorney, Agent, or Firm—Michael Ebert

[57] ABSTRACT

An electromagnetic flowmeter in which the fluid being metered is conducted through a flow tube having a pair of electrodes, the fluid intersecting a magnetic field whereby the resultant voltage induced in the fluid is transferred to the electrodes to provide a signal indicative to flow rate. The magnetic field is created by a pair of pole pieces formed of "hard" magnetic material. The pieces are placed at diametrically-opposed positions and are magnetically interconnected to define a magnetic circuit. Excitation pulses which alternate in polarity are periodically applied by respective magnet drivers to coils wound about the pole pieces to alternately magnetize the pieces in one direction and remagnetize the pieces in the reverse direction, thereby establishing the desired field. The duty cycle of the pulses is such as to reduce the average power requirements to a very low level. In order to operate the flowmeter from a standard 50 or 60 Hz power line, the line voltage is divided by an odd integer to permit the magnet drivers to be alternately triggered on the peak positive and peak negative crests of the power line voltage.

14 Claims, 4 Drawing Figures

ELECTROMAGNETIC FLOWMETER WITH ALTERNATING PERMANENT MAGNET FIELD

BACKGROUND OF INVENTION

1. Field of Invention

This invention relates generally to electromagnetic flowmeters, and more particularly to a flow meter which is operated from a standard alternating current power line and whose electromagnetic field is produced by pole pieces of "hard" magnetic material that are alternately reversed in magnetization by coils associated therewith to which driver pulses are applied that are derived from the line voltage in a manner requiring relatively little power.

2. The Prior Art

In an electromagnetic flowmeter, the fluid whose flow rate is to be measured is conducted through a flow tube provided with a pair of diametrically-opposed electrodes, a magnetic field perpendicular to the longitudinal axis of the tube being established by electromagnets. When the flowing liquid intersects the field, a voltage is induced therein which is transferred to the electrodes to provide an output signal. This signal is proportional to the average velocity of the liquid and hence to its average volumetric rate, is then amplified and processed to actuate a recorder or indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though A-C operation is clearly advantageous in that polarization is obviated and the A-C flow induced signal may be more easily amplified, it has distinct drawbacks. The use of an alternating flux introduces spurious voltages that are unrelated to flow rate and, if untreated, give rise to inaccurate indications.

The adverse effects encountered in A-C operation of electromagnetic flowmeters can be attributed to the rate of change of the flux field $(d\phi)/dt$, serving to induced unwanted signals in the pick-up loop. If, therefore, the rate of change of the flux field could be reduced to zero value, then the magnitude of quadrature and of its in-phase component would become non-existent. Zero drift effects would disappear.

When the magnetic flux field is a steady state field, as for example, with continuous d-c operation, the ideal condition $d\phi/dt=0$ is satisfied. But, as previously noted, d-c operation to create a steady state field is not acceptable, for galvanic potentials are produced and polarization is encountered.

In the patent to Mannherz et al., U.S. Pat. No. 3,783,687, and in my prior U.S. Pat. No. 4,370,892, whose entire disclosures are incorporated herein by reference, there are disclosed an electromagnetic flowmeter in which the excitation current for the electromagnetic coil is a low-frequency wave serving to produce a periodically-reversed steady state flux field, whereby unwanted in-phase and quadrature components are minimized without giving rise to polarization and galvanic effects. This low frequency wave is derived by means of a presettable scaler coupled to the standard a-c power line (60 Hz) and is at a frequency in the order of $1\frac{7}{8}$, $3\frac{3}{4}$, $7\frac{1}{2}$ or 15 Hz.

In conventional electromagnetic flowmeters, the electromagnetic field is established by a pair of electromagnets placed at diametrically-opposed positions on the tube. Each electromagnet is constituted by a core of "soft" magnetic material having a coil wound thereon which, when supplied with current, acts to strongly magnetize the core. When current flow is interrupted, the core is then almost completely demagnetized.

Commercial magnetic materials are divided into two main groups: (1) magnetically "soft" materials, and (2) magnetically "hard" materials. The distinguishing characteristic of "soft" magnetic materials is high permeability. These materials are usually employed as cores or the magnetic circuits of electromagnets. "Hard" magnetic materials are characterized by a high maximum magnetic energy product $(BH)_{max}$. These materials are employed as permanent magnets to provide a constant magnetic field when it is inconvenient or uneconomical to produce this field by an electromagnet.

The chief drawback of the conventional electromagnetic flowmeter which uses soft magnetic materials is that its power requirements are substantial. In order to reduce these power requirements, the U.S. Pat. No. 4,409,846 to Ueno discloses a meter which makes use of hard magnetic materials in association with coils to which pulses of alternating polarity are applied to periodically demagnetize the magnets. While the arrangement disclosed in this patent does bring about a reduction in power consumption, it is not adapted to be operated from a standard alternating-current power line and to take advantage of the frequency of the line current to produce alternating excitation pulses for the coils.

SUMMARY OF INVENTION

In view of the foregoing, the main object of this invention is to provide an electromagnetic flowmeter in which an alternating electromagnetic field is produced by pole pieces of "hard" magnetic material that are alternately reversed in magnetization by means of coils associated with the pole pieces that are excited by alternating pulses supplied thereby by respective magnet drivers which are triggered by pulses derived from a standard alternating current power line.

A significant advantage of an electromagnetic flowmeter in accordance with the invention is that it requires relatively little average power to operate, yet it produces a strong output signal.

Briefly stated, these objects are attained in an electromagnetic flowmeter in which the fluid being metered is conducted through a flow tube having a pair of electrodes, the fluid intersecting a magnetic field whereby the resultant voltage induced in the fluid is transferred to the electrodes to provide a signal indicative of flow rate. The magnetic field is created by a pair of pole pieces formed of "hard" magnetic material. The pieces are placed at diametrically-opposed positions and are magnetically interconnected to define a magnetic circuit. Excitation pulses which alternate in polarity are periodically applied by respective magnet drivers to coils wound about the pole pieces to alternately magnetize the pieces in one direction and remagnetize the pieces in the reverse direction, thereby establishing the desired field. The duty cycle of the pulses is such as to reduce the average power requirements to a very low level. In order to operate the flowmeter from a standard 50 or 60 Hz power line, the line voltage is divided by an odd integer to permit the magnet drivers to be alternately triggered on the peak positive and peak negative crests of the power line voltage.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

The Electromagnetic Flowmeter

Figure 1:
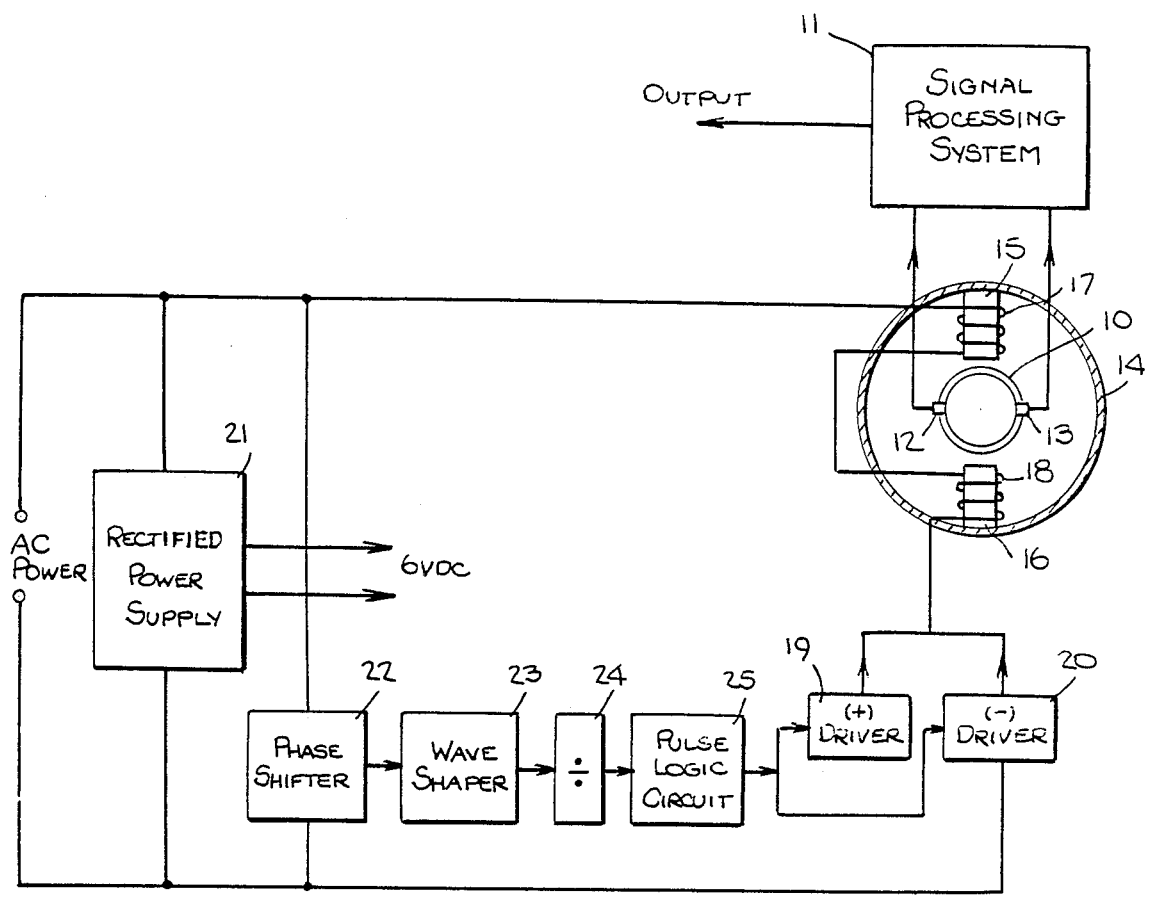
FIG. 1 is a block diagram of an electromagnetic flowmeter in accordance with the invention.

Referring now to FIG. 1, there is shown a flowmeter in accordance with the invention constituted by a primary including a flow tube 10 through which the fluid to be metered is conducted, the primary yielding a low frequency signal output whose output is proportional to the flow rate of the fluid, and a secondary including a signal processor 11 which converts the low level a-c signal to a propotional d-c current output signal in a current range useful in industrial process control, such as 4 to 10 mA. The secondary may be of the type disclosed in the above-identified Mannherz patent or of any other known type and forms no part of the present invention.

Flow tube 10 is provided with a pair of electrodes 12 and 13 in contact with the fluid. These electrodes are mounted at diametrically-opposed positions on the tube along an electrode axis which is perpendicular to the longitudinal flow axis.

Supported on a "soft" ferromagnetic cylindrical casing 14 concentric with flow tube 10 in the annular region between the casing and the tube are a pair of pole pieces 15 and 16 formed of "hard" magnetic material. These pieces lie at diametrically-opposed positions with respect to the flow tube on an axis which is perpendicular to an electrode axis. The casing magnetically interconnects pole pieces 15 and 16 and formed a magnetic circuit therewith.

In practice, the physical structure for the primary may be similar to the flangeless flowmeter disclosed in my prior U.S. Pat. No. 4,181,018, in which the flow tube is formed of nonmagnetic material and is coaxially disposed within a cylindrical ferromagnetic casing on which electromagnets are supported, the annular region between the tube and casing being filled with a potting compound to stabilize and protect the structure. Also disclosed in this patent is an arrangement where, in lieu of a metal casing the electromagnets are embedded in a cylindrical insulating body surrounding the tube, in which arrangement the cores are magnetically interconnected by straps.

Wound about pole piece 15 is a coil 17, and about pole piece 16 is a coil 18. These coils are serially connected, one end going to the live side L of a standard AC power line. The other end of the serially connected coils is connected to a (+) driver 19 and to a (−) driver 20 which are alternately triggered in a manner to be later explained to apply excitation pulses to the coils which alternate in polarity.

The magnetization of a ferromagnetic material is a function of the magnetic field (H) applied thereto. The induction starts at zero field and reaches maximum induction ($B_m$) and a maximum field ($H_m$) when the material is saturated. When the magnetic field is decreased, the induction will then follow a curve with higher values than the original curve. At H=0, there remains an induction $B_h$ which is the residual induction or remanence.

The maximum residual induction when a ferromagnetic material is fully magnetized is called retentivity. In order to remove retentivity, one applies a negative magnetic field to the material, induction being completely removed at $H_c$, the coercive force, or its maximum, called coercivity. This process of removing residual induction is referred to as demagnetization.

Permanent magnets which are formed of highly retentive materials are grouped in different classes, such as precipitation-hardened alloyed, quench-hardened alloys, work-hardened alloys and ceramics. For permanent magnets, high values of residual inducation and coercive force are required.

Alnico is a precipitation-hardened alloy having the highest energy per unit of volume of any permanent magnet material commercially available. Among the quench-hardened alloys are chrome magnet and cobalt magnet steels. Barium ferrite is typical of the materials used in ceramic permanent magnets.

A "hard" magnetic material can be magnetized in one direction, then demagnetized and re-magnetized in the reverse direction an infinite number of times without adversely affecting the material. Magnetization takes place almost instantaneously, provided that high enough ampere turns are used to overcome the coercive force. The actual magnetization time is therefore not effectively limited by the magnetic material but only by the time constant of the magnetizing coil.

In operation, when a positive pulse having high energy (ampere turns) is applied to a coil surrounding a "hard" pole piece, this results in magnetization thereof in one polarity. This action is followed by a high energy negative pulse to effect demagnetization thereof and remagnetization in the reverse polarity.

In the arrangement shown in FIG. 1, when a positive pulse is applied by (+) driver 19 to the serially-connected coils 17 and 18, this effects opposing magnetization of the pole pieces 15 and 16, so that the pieces present to flow tube 10 south (S) and north (N) poles, respectively. The lines of flux bridging these poles through tube 10 create a magnetic field whose lines are normal to the direction of fluid flow. When thereafter a negative pulse from (−) driver 20 is applied to the coils, the pole pieces are demagnetized and remagnetized in the reverse polarity, so that now pole piece 15 is south (S) and pole piece 16 is north (N) to reverse the flux field.

By making each high ampere-turn pulse extremely short in duration in the order of, say, tens or hundreds of microseconds, and by bringing about a magnetic flux reversal four to ten times per second, the average input power to the coils will then have a very low value.

For example, assuming that 20 amperes flow into a 250 turn coil or 5000 N.I. for a period of 100 microseconds, and that the excitation is reversed 10 times per second, then the duty cycle becomes 0.0001/0.1 or 0.001, and 0.001 times 20 amperes results in an average current input of 0.02 amperes, or an average ampere turn of 0.25 N.I. With a total coil resistance of, say, one ohm, then in the above example the peak power would be 400 watts, or an average of 0.4 watts.

In one working embodiment, the pole pieces were made of Alnico #V having a coercive force of 700 orsteads. This is ten times higher than a 3.5% chromium-iron magnet. If a 3.5% Cr-Fe magnet were used, the ampere turns would be reduced to 2 amps, resulting in a peak power of 4 watts and an average power of 0.0004 watts.

Thus, the choice of "hard" magnetic material and the design of the coils, as well as the selected duty cycle of the pulses, determine the average power level.

A system in accordance with the invention employs high energy pulses of short duration to effect the magnetic reversal of the magnets which establish the magnetic field in the flowmeter. In order to effect a reversal of X number of gauss, one requires Y number of ampere turns. Hence the shorter the time can be made to achieve YNA, the lower becomes the the average power. In other words, the average power in watts is equal to peaks watts times the duty cycle.

In a system in which excitation pulses for the magnet system are derived from a standard a-c power line (120 volts, 50 or 60 Hz), fairly large storage capacitors and relatively large transformers are required for this purpose. In order to dispense with this requirement, in a system in accordance with the invention which is operated from a standard a-c power line, the power line frequency is divided by an odd integer (i.e., 3, 5, 7, etc.). This permits magnet drivers 19 and 20 to be alternately triggered on peak positive and negative crests of the power line voltage.

The crest voltage will, for example, be equal to 120 Vrms (Sin $\phi$)$\sqrt{2}$. Hence for the following phase angles at 60 Hz, the resultant voltage will be as follows:

| | |
|---|---|
| 80° | 167 vp |
| 85° | 169 vp |
| 90° | 170 vp |
| 95° | 169 vp |
| 100° | 167 vp |

Also, with a 60 Hz power line frequency, the time will be 46.3$\mu$ sec. per degree. Hence a 10 degree phase shift will result in a pulse of 463$\mu$ sec. with a voltage change of only one volt, if centered around 90 degrees.

In order to achieve with a minimum amount of energy the desired ampere turns in a given coil volume and with a permanent magnet BH product (demagnetization energy), the duty cycle should be as low as possible. That is to say, if the duty cycle→0, then watts→0. This can be attained by reducing the coil turns to one turn and by raising the voltage to a level of thousands of volts. But, of course, this is impractical, for present technology and economics dictate operating limits at tens of ampere turns and hundreds of volts.

In order, therefore, to implement a drive system in accordance with the invention in which the power consumption of the flowmeter is significantly reduced, as shown in FIG. 1, the 60 Hz a-c line voltage is reduced and rectified in a rectifier power supply 21 whose 6 volt d-c output supplies d-c operating power to the various stages of the system.

The 60 Hz line voltage is also applied to a phase shifter 22 which shifts the phase (−85°). The output of phase shifter 22 is converted by a wave shaper 23 into a square wave which is applied to a frequency divider 24. This divider divides the incoming wave by an odd integer (i.e., 3, 5, 7, etc.). The output of divider 24 goes into a pulse logic 25 which acts to provide triggering pulses for the (+) and (−) drivers 19 and 20 at the correct times and for the desired brief durations.

Figure 2:
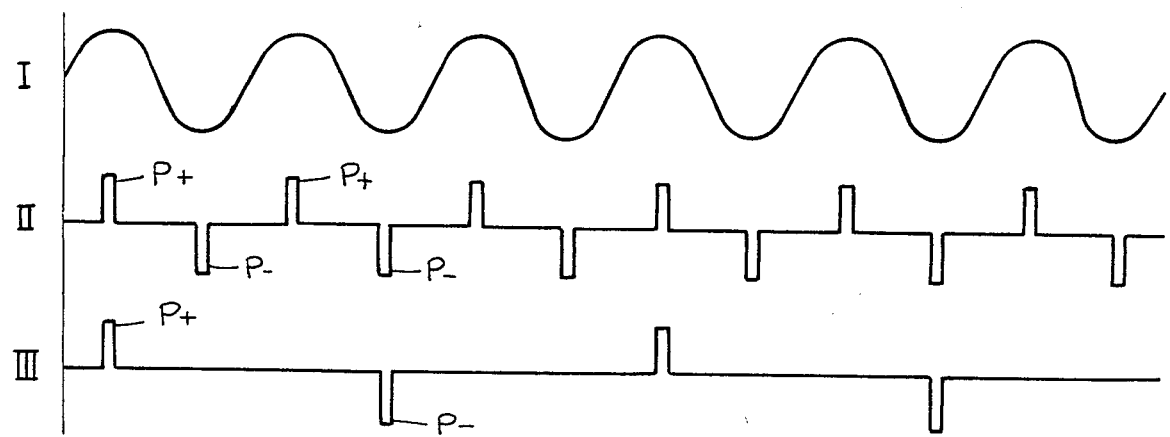
FIG. 2 shows the waveform of excitation pulses used for the flowmeter.

Referring to FIG. 2, the sinusoidal waveform I shows the 60 Hz voltage of the power line voltage. If alternating pulses were derived from the 60 Hz line voltage at the positive ane negative peaks thereof, then the positive and negative drive pulses P+ and P− would, as shown in II, coincide with the negative and positive peaks of each a-c cycle of the line voltage. However, assuming that the line frequency had been divided by an odd integer (3), then, as shown in waveform III, the positive pulse P+ coincides with the positive peak of the first positive half cycle of the 60 Hz wave, while the negative pulse P−, which follows, coincides with the second negative half cycle of the 60 Hz wave.

The Magnet Drive System

Figure 3:
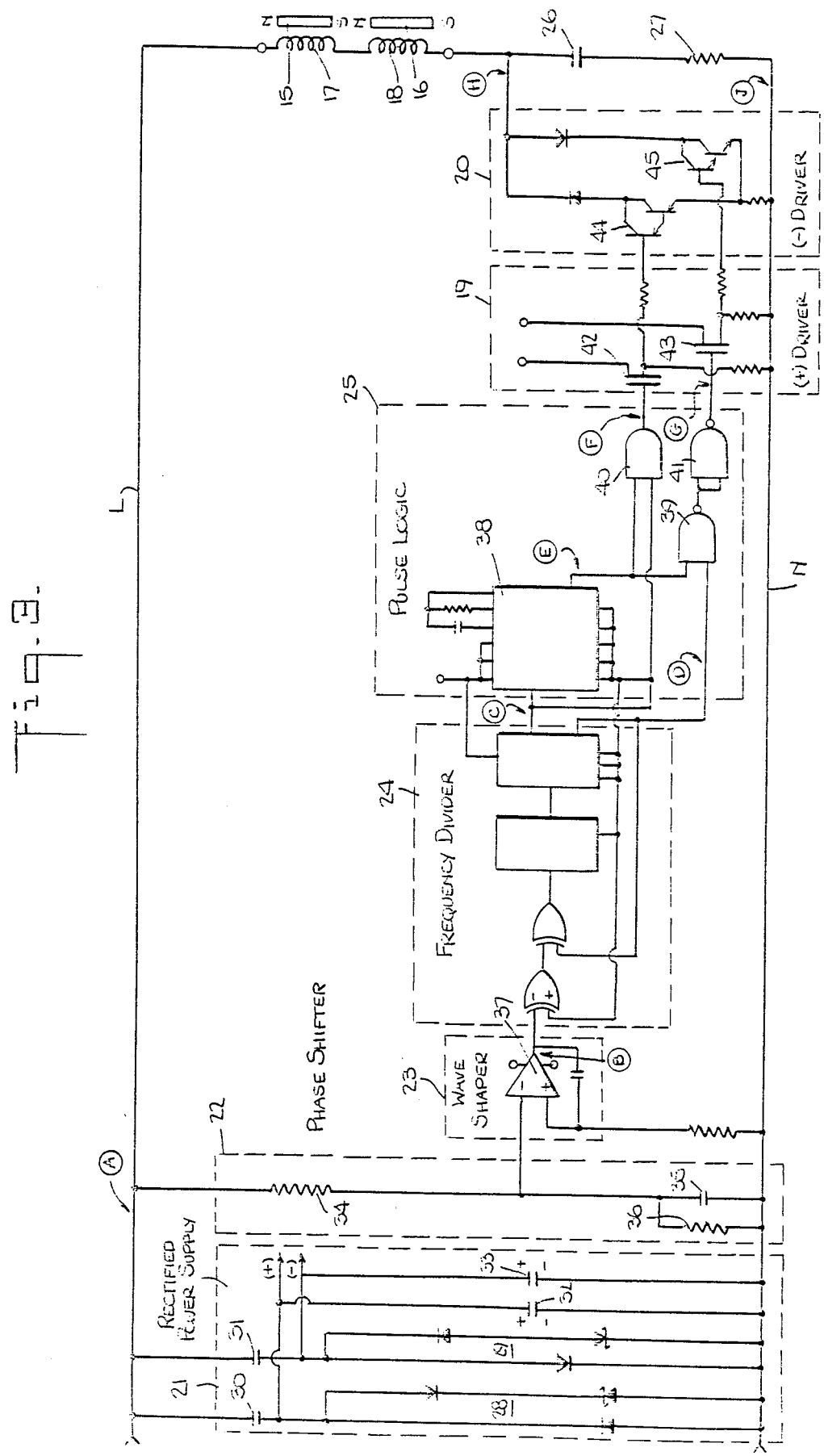
FIG. 3 is a schematic diagram of the magnet drive system included in the flowmeter.
Figure 4:
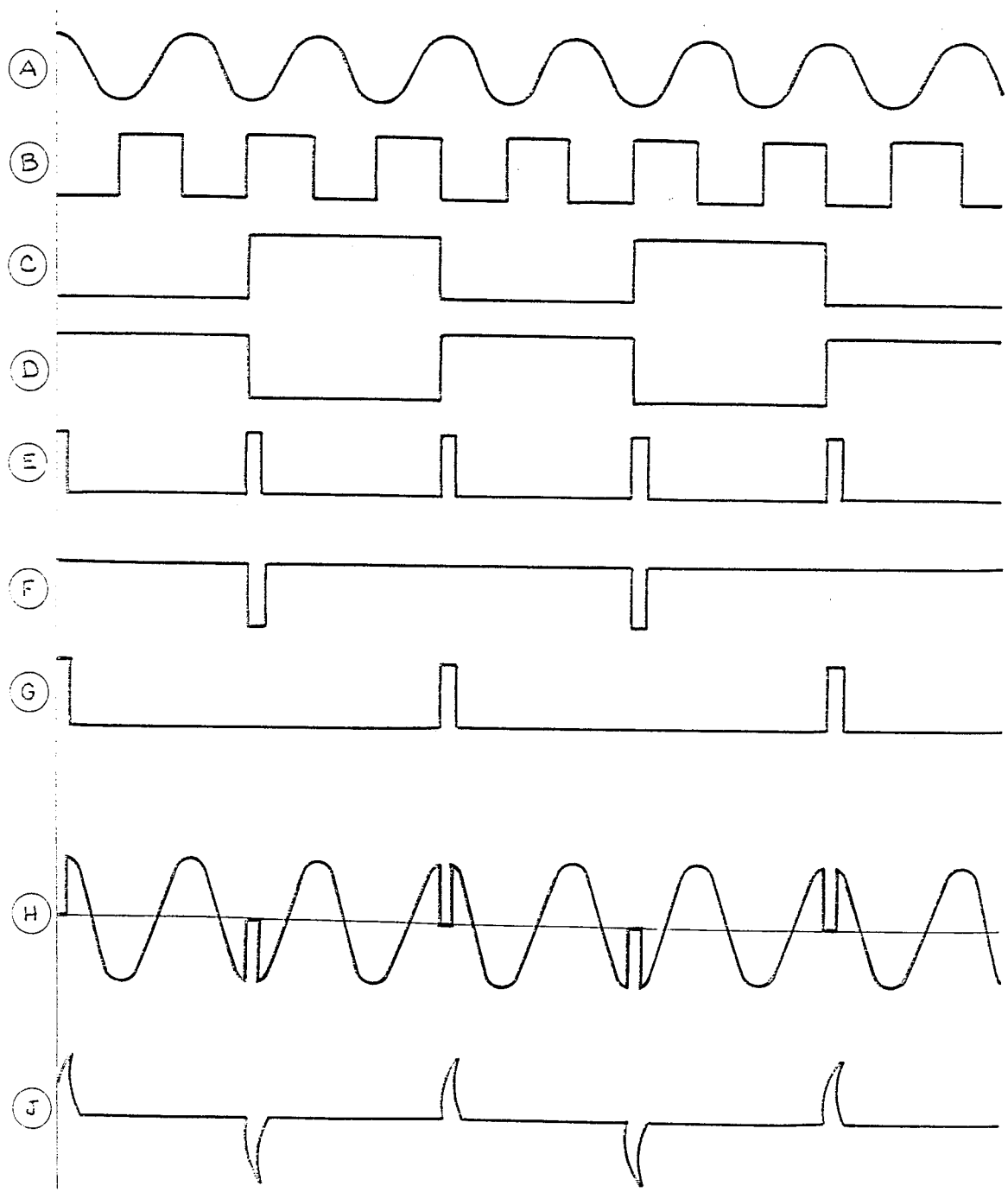
FIG. 4 shows the waveforms at various points in the magnet drive system.

Reference is now made to FIG. 3, which is a schematic diagram of the magnet drive system included in the primary of the flowmeter shown in FIG. 1, and to FIG. 4 which illustrates the waveforms of voltages appearing at various points in the system.

It will be seen that coils 17 and 18 of the electromagnetic flowmeter are connected in series. One end of these series-connected coils is connected to the live conductor L of the incoming 60 Hz, 120 V power line. The other end is connected through capacitor 26 in series with resistor 27 to the neutral or grounded conductor N of the power line. The 60 Hz sinusoidal waveform of the incoming power voltage is represented by A in FIG. 4.

Connected across conductors L and N is the rectifier power supply 21. The ac line voltage is applied to diode networks 28 and 29 through capacitors 30 and 31, respectively. These capacitors serve to reduce the voltage rather than conventional resistors for this purpose, for with capacitors there is zero power loss when dropping the voltage from 120 Vrms to 6 volts dc. The 6 volt d-c output of power supply 21 serves to power the various solid-state stages of the flowmeter. Connected to the positive side of the 6 vdc output is a filter capacitor 32, and to the negative side, a filter capacitor 33.

Also connected across the 60 Hz line is phase shifter 22 which is shown as being constituted by a resistor 34 in series with a capacitor 35 shunted by a resistor 36. In a preferred embodiment, the phase shift is −85°, although the invention is not limited to this specific value.

The phase-shifted 60 Hz output of phase shifter 22 is applied to wave shaper 23. This is constituted by a comparator 37 which functions to shape the 60 Hz sinusoidal wave into a square wave B whose form is shown in FIG. 4. Square wave B is fed to frequency divider 24 which in the preferred embodiment divides by the odd integer 3, thereby producing a 20 Hz square wave. The frequency divider has two outputs which are 180 degrees out of phase with each other, one output yielding square wave C and the other square wave D, as shown in FIG. 4.

The 20 Hz square waves C and D are fed to pulse logic 25. Square wave C is applied to an integrated circuit chip 38 which yields, in response thereto, positive pulses E (see FIG. 4), a pulse being produced at the leading and trailing edges of each square wave C.

Pulses E are applied to one input of a gate 39 to whose other input is applied the 20 Hz square wave D from frequency divider 24. Pulses E are also applied to one input of a gate 40 to whose other input is applied the 20 Hz square wave C from the divider. Gate 40 yields negative pulses F (see FIG. 4) which coincide with alternate positive pulses E.

The output of gate 39 is applied to an inverter 41 which yields positive pulses G (see FIG. 4) which coincide with those positive pulses E that are not coincident with negative pulses F. The negative pulses F and the positive pulses G from pulse logic 25 are applied to the (+) magnet driver 19 and the (−) magnet driver 20, which includes transistors 42, 43, 44 and 45.

The output of the drivers is applied to the junction of capacitor 26 and the series-connected coils 17 and 18, the resultant waveform H being shown in FIG. 4. The waveform J represents the voltage developed at the other end of resistor 27 in the coil circuit.

Thus, the (+) and (−) drivers 19 and 20 are alternately triggered on the peak positive and peak negative crests of the incoming line voltage to provide high energy pulses of short duration to effect magnet reversal of the hard magnetic cores 15 and 16, whereby the resultant average power consumption is exceptionally low. If the system is to be operated at 60 Hz, then the divider portion of the circuit would be eliminated.

While there has been shown and described a preferred embodiment of an electromagnetic flowmeter with alternating permanent magnet field in accordance with the invention, it will be appreciated that many changes and modifications may be made therein without, however, departing from the essential spirit thereof.

I claim:

1. An electromagnetic flowmeter comprising:
(A) a flow tube through which the fluid to be metered is conducted, said tube having a pair of electrodes in contact with the fluid;
(B) means to establish an alternating magnetic field across the tube to be intersected by the fluid flowing therethrough to induce a voltage therein which is transferred to the electrodes and has a value that is a function of flow rate, said means being constituted by a magnet circuit which includes a pair of pole pieces of hard magnetic material disposed at diametrically-opposed positions, each piece having a coil wound thereon;
(C) positive and negative drivers to periodically apply excitation pulses of alternating polarity to said coils to alternately magnetize the pole pieces in one direction and remagnetize the pole pieces in the reverse direction, thereby to establish said field; and
(D) means to alternately trigger said drivers on the peak positive and peak negative crests of a standard a-c power line voltage.

2. A flowmeter as set forth in claim 1, wherein the pulses have a duty cycle resulting in a low level of average power.

3. A flowmeter as set forth in claim 1, wherein said magnetic circuit is formed by a ferromagnetic cylindrical casing concentric with said tube, said pole pieces being disposed in the annular region between said tube and said casing and being attached to said casing.

4. A flowmeter as set forth in claim 1, wherein said pulses each have a duration of several microseconds, one pulse being produced during an interval having a millisecond duration whereby the duty cycle of the pulses is such as to reduce the average excitation power to a very low level.

5. A flowmeter as set forth in claim 1, wherein said pole pieces are formed of Alnico.

6. A flowmeter as set forth in claim 1, wherein said coils are connected in series.

7. A flowmeter as set forth in claim 1, wherein said drivers are triggered by pulses produced by a pulse logic to whose input is applied square wave pulses yielded by a wave shaper to whose input is applied a sinusoidal wave derived from said a-c power line.

8. A flowmeter as set forth in claim 7, further including a phase shifter interposed between said a-c power line and said pulse logic, said phase shifter introducing a shift of about −90 degrees.

9. A flowmeter as set forth in claim 8, wherein said shift is −85 degrees.

10. A flowmeter as set forth in claim 8, further including a frequency divider interposed between said wave shaper and said pulse logic to divide the frequency of the square wave pulses by an odd integer.

11. A flowmeter as set forth in claim 10, wherein said odd integer is 3.

12. A flowmeter as set forth in claim 10, wherein said wave shaper is a comparator.

13. A flowmeter as set forth in claim 1, further including a rectifier power supply connected across said line to produce a low voltage d-c output for powering said drivers.

14. A flowmeter as set forth in claim 13, wherein said supply includes rectifier networks which are connected by capacitors to said a-c line to reduce the voltage applied to said networks.

* * * * *